(12) United States Patent
Zhao et al.

(10) Patent No.: US 10,700,525 B2
(45) Date of Patent: Jun. 30, 2020

(54) METHOD AND APPARATUS FOR CONTROLLING HYBRID DIRECT-CURRENT TRANSMISSION SYSTEM

(71) Applicants: NR Electric Co., Ltd., Jiangsu (CN); NR Engineering Co., Ltd., Jiangning, Nanjing (CN)

(72) Inventors: Wenqiang Zhao, Jiangsu (CN); Nannan Wang, Jiangsu (CN); Yongping Wang, Jiangsu (CN); Jiang Lu, Jiangsu (CN); Chuanjun Bai, Jiangsu (CN); Yu Lu, Jiangsu (CN)

(73) Assignees: NR ELECTRIC CO., LTD, Nanjing, Jiangsu (CN); NR ENGINEERING CO., LTD, Nanjing, Jiangsu (CN)

( * ) Notice: Subject to any disclaimer, the term of this patent is extended or adjusted under 35 U.S.C. 154(b) by 0 days.

(21) Appl. No.: 16/079,967

(22) PCT Filed: Jan. 19, 2017

(86) PCT No.: PCT/CN2017/071657
§ 371 (c)(1),
(2) Date: Aug. 24, 2018

(87) PCT Pub. No.: WO2017/152720
PCT Pub. Date: Sep. 14, 2017

(65) Prior Publication Data
US 2019/0052087 A1  Feb. 14, 2019

(30) Foreign Application Priority Data
Mar. 10, 2016  (CN) .......................... 2016 1 0135189

(51) Int. Cl.
*H02J 3/00* (2006.01)
*H02J 3/36* (2006.01)
(Continued)

(52) U.S. Cl.
CPC .................. *H02J 3/36* (2013.01); *H02M 1/32* (2013.01); *H02M 5/4585* (2013.01);
(Continued)

(58) Field of Classification Search
CPC ............ H02J 3/36; H02M 1/32; H02M 7/483; H02M 5/4585; H02M 2007/4835; H02M 7/7575
See application file for complete search history.

(56) References Cited

U.S. PATENT DOCUMENTS

2015/0145252 A1* 5/2015 Lin ....................... H02M 7/145
290/44
2015/0155716 A1   6/2015 Balda et al.

FOREIGN PATENT DOCUMENTS

CN  103701145 A   4/2014
CN  104218573 A  12/2014
(Continued)

OTHER PUBLICATIONS

WIPO, State Intellectual Property Office of the P.R. China International Search Authority, International Search Report and Written Opinion dated Mar. 31, 2017 in International Patent Application No. PCT/CN2017/071657 with English Translation of International Search Report, 10 pages.
(Continued)

*Primary Examiner* — Adolf D Berhane
*Assistant Examiner* — Afework S Demisse
(74) *Attorney, Agent, or Firm* — Masuvalley & Partners

(57) ABSTRACT

A method and apparatus for controlling a hybrid direct-current (DC) transmission system. The method comprises: adjusting the total number of inserted sub-modules of a modular multi-level converter and the polarity of an output level of the inserted sub-modules in real time, according to a DC voltage of a rectifier station at other end; or adjusting
(Continued)

the total number of inserted sub-modules of a modular multi-level converter and the polarity of an output level of the inserted sub-modules in real time, according to the magnitude of a DC current or DC power; or adjusting the total number of inserted sub-modules of a modular multi-level converter and the polarity of an output level of the inserted sub-modules in real time, according to both the magnitude of the DC current and the DC voltage of the rectifier station at the other end. The method can effectively control the DC voltage and the direct current of a hybrid DC transmission system, avoiding the power transmitting breakdown.

10 Claims, 4 Drawing Sheets

(51) Int. Cl.
    *H02M 1/32*    (2007.01)
    *H02M 5/458*   (2006.01)
    *H02M 7/483*   (2007.01)
    *H02M 7/757*   (2006.01)

(52) U.S. Cl.
    CPC .......... *H02M 7/483* (2013.01); *H02M 7/7575* (2013.01); *H02M 2001/325* (2013.01); *H02M 2007/4835* (2013.01); *Y02E 60/60* (2013.01)

(56) References Cited

FOREIGN PATENT DOCUMENTS

| | | |
|---|---|---|
| CN | 104795834 A | 7/2015 |
| CN | 104852401 A | 8/2015 |
| CN | 104917415 A | 9/2015 |
| CN | 105762824 A | 7/2016 |

OTHER PUBLICATIONS

Yu, Feng et al., "A Fast Voltage Balancing Control Method for Modular Multilevel Converter," *Proceedings of the CSEE, Chin. Soc. for Elec. Eng.* vol. 35, No. 4, Feb. 20, 2015, pp. 929-934, 6 pages.

* cited by examiner

METHOD AND APPARATUS FOR CONTROLLING HYBRID DIRECT-CURRENT TRANSMISSION SYSTEM

RELATED APPLICATIONS

This application is the U.S. National Phase of and claims priority to International Patent Application No. PCT/CN2017/071657, International Filing Date Jan. 19, 2017, entitled Method And Apparatus For Controlling Hybrid Direct-Current Transmission System; which claims benefit of Chinese Patent Application No. 201610135189.4 filed Mar. 10, 2016; both of which are incorporated herein by reference in their entireties.

BACKGROUND OF THE INVENTION

Technical Field

In the field of direct-current (DC) transmission, the present invention relates to a control method and apparatus applied in a DC transmission system with at least one end formed by a modular multi-level converter, and in particular, to a method and apparatus for controlling a hybrid DC transmission system.

BACKGROUND

High-voltage direct current (HVDC) transmission technology can be classified into two types: a line-commutated converter based HVDC (LCC-HVDC), and a voltage-source converter based HVDC (VSC-HVDC). The LCC-HVDC technology has low cost, slight losses, and mature operational experience. Most of world's operating DC transmission systems are the LCC-HVDC. However, the LCC-HVDC has shortcomings such as a commutation failure problem, strong dependence on the connected alternating current (AC) system, consumption of a large amount of reactive power, a large space occupied by the converter station, and the like. The new-generation VSC-HVDC technology can implement de-coupling control of active power and reactive power, does not require reactive power compensation, has a compact structure and small occupied area, and avoids the commutation failure problem. However, at present, it also has some defects such as vast expense, high dissipation, and so on. Therefore, if a sending end using an LCC converter and a receiving end using a VSC converter form a hybrid DC transmission system, the advantages of both technologies can be merged and the disadvantages can be compensated: higher power rating for a single LCC converters, minimization of losses due to the use of LCC technology, less installation costs for LCC technology, higher technical maturity and higher operating efficiency of LCC technology, less space requirements for VSC converters since no filters are necessary, black start capability of VSC, independent P/Q control of VSC, and no commutation failure problem of the VSC. Thus, the hybrid-HVDC will have a broad application prospect.

However, the existing hybrid DC transmission system has the following problem: when the AC grid at the sending end in which the LCC is located has a fault, especially, a severe ground fault, the DC voltage output by the LCC decreases with the AC voltage. However, in the existing VSC-HVDC technology, the DC voltage of the VSC converter cannot be directly and individually controlled according to a DC reference voltage, which can only be indirectly controlled by changing the capacitor voltage or the capacitor voltage of the sub-module. Furthermore, the DC voltage cannot be dramatically reduced under the limitation of a modulation index. Therefore, in the case where the AC voltage of the sending end greatly drops, the maximum DC voltage of the LCC rectifier is less than that of the VSC inverter. The DC current will rapidly fall to zero, and the power transmitting breakdown occurs, which has greater impact on the connected AC system compared with the commutation failure. Duration of the power transmission breakdown is nearly the same as that of the fault. Therefore, it is necessary to find an effective control method to avoid the power transmitting breakdown in such a case.

SUMMARY OF THE INVENTION

An objective of the present invention is to provide a method and apparatus for controlling a hybrid DC transmission system, which can effectively control the DC voltage and the DC that are output by a modular multi-level converter, effectively avoiding the power transmitting breakdown caused by an AC fault at the LCC side.

To achieve the foregoing objective, the present invention adopts the following technical solutions:

A method for controlling a hybrid DC transmission system is provided, where the hybrid DC transmission system includes a rectifier converter station connecting to an AC power grid at a sending end, an inverter converter station connecting to an AC power grid at a receiving end, and a DC transmission line connecting the rectifier converter station and the inverter converter station, the rectifier converter station including at least one group of current source converter units, and the inverter converter station including at least one group of modular multi-level converter units. The method includes: the hybrid DC transmission system adjusting the total number of inserted sub-modules of a modular multi-level converter and the polarity of an output level of the inserted sub-modules in real time, according to a DC voltage of a rectifier station at other end; or adjusting the total number of inserted sub-modules of a modular multi-level converter and the polarity of an output level of the inserted sub-modules in real time, according to the magnitude of a DC current or DC power; or adjusting the total number of inserted sub-modules of a modular multi-level converter and the polarity of an output level of the inserted sub-modules in real time, according to both the magnitude of the DC current and the DC voltage of the rectifier station at the other end.

In the method for controlling a hybrid DC transmission system, the DC voltage of the rectifier station at the other end refers to an actually measured value of the DC voltage or a calculated value of the DC voltage.

In the method for controlling a hybrid DC transmission system, the total number of the inserted sub-modules of the modular multi-level converter refers to the number of all sub-modules that are actually put into operation and output a level unequal to zero in one phase of the modular multi-level converter.

In the method for controlling a hybrid DC transmission system, sub-modules capable of outputting a negative level are used to comprise the arms of the modular multi-level converter.

The present invention further provides an apparatus for controlling a hybrid DC transmission system, which includes: a sampling unit, a determining unit, and a main control unit, where:

the sampling unit is used for acquiring a DC voltage and a DC current of the hybrid DC transmission system, an AC of an AC power grid to which a modular multi-level converter is connected, and capacitor voltages of sub-modules of the modular multi-level converter;

the determining unit is used for determining, according to a status of a relevant analog quantity acquired by the sampling unit, whether there is a deviation between a DC power or the DC current transmitted by the hybrid DC transmission system and a reference value; and the main control unit is used for adjusting the total number of inserted sub-modules of the modular multi-level converter and the polarity of an output level of the inserted sub-modules in real time, according to a DC voltage of a rectifier station at the other end; or adjusting the total number of inserted sub-modules of the modular multi-level converter and the polarity of an output level of the inserted sub-modules in real time, according to the magnitude of a DC current or DC power; or adjusting the total number of inserted sub-modules of the modular multi-level converter and the polarity of an output level of the inserted sub-modules in real time, according to both the magnitude of the DC current and the DC voltage of the rectifier station at the other end.

After use of the foregoing solutions, the present invention achieves the following beneficial effects:

(1) Through the control method provided by the present invention, the DC voltage output by the modular multi-level converter can be changed in a large range from −Ud to +Ud, effectively avoiding power transmitting breakdown caused by an AC fault at the LCC side.

(2) Through the control method provided by the present invention, the hybrid DC transmission system can effectively control the DC and DC power.

(3) Through the control method provided by the present invention, the voltage polarity of the hybrid DC transmission system can be easily and rapidly reversed.

DETAILED DESCRIPTION OF THE INVENTION

The technical solutions of the present invention are further described in detail below with reference to the accompanying drawings and specific embodiments.

A hybrid DC transmission system includes a rectifier converter station connecting to an AC power grid at a sending end, an inverter converter station connecting to an AC power grid at a receiving end, and a DC transmission line connecting the rectifier converter station and the inverter converter station. The inverter converter station is connected to the AC power grid at the receiving end via a transformer. The rectifier converter station includes at least one group of current source converter units, and the inverter converter station includes at least one group of modular multi-level converter units.

Generally, the rectifier converter station uses a current source converter based on a thyristor device, where the current source converter may have a six-pulse bridge circuit, a twelve-pulse bridge circuit, or a dual-twelve-pulse bridge circuit. The inverter converter station uses a modular multi-level converter based on a fully-controlled power electronic device. Sub-modules capable of outputting a negative level are used to compose the arms of a voltage source converter, such as full-bridge sub-modules, clamp double sub-modules, or dual clamp double sub-modules. A switch device of the sub-modules is a fully-controlled switch device, such as an IGBT, IGCT, IEGT or GTO.

Figure 1:
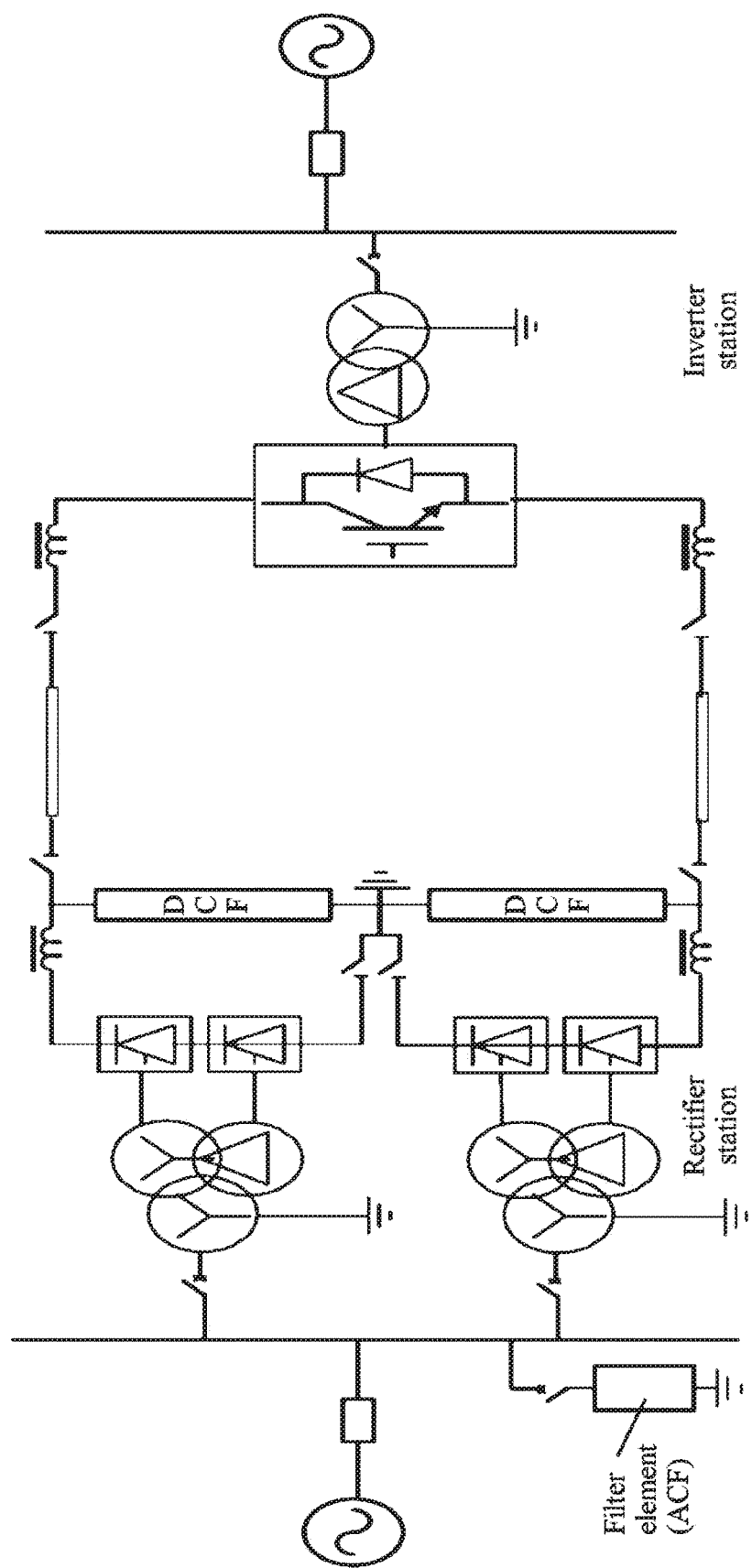
FIG. 1 is a schematic diagram of a hybrid dual-end DC transmission system based on unipolar symmetrical wiring.
Figure 2:
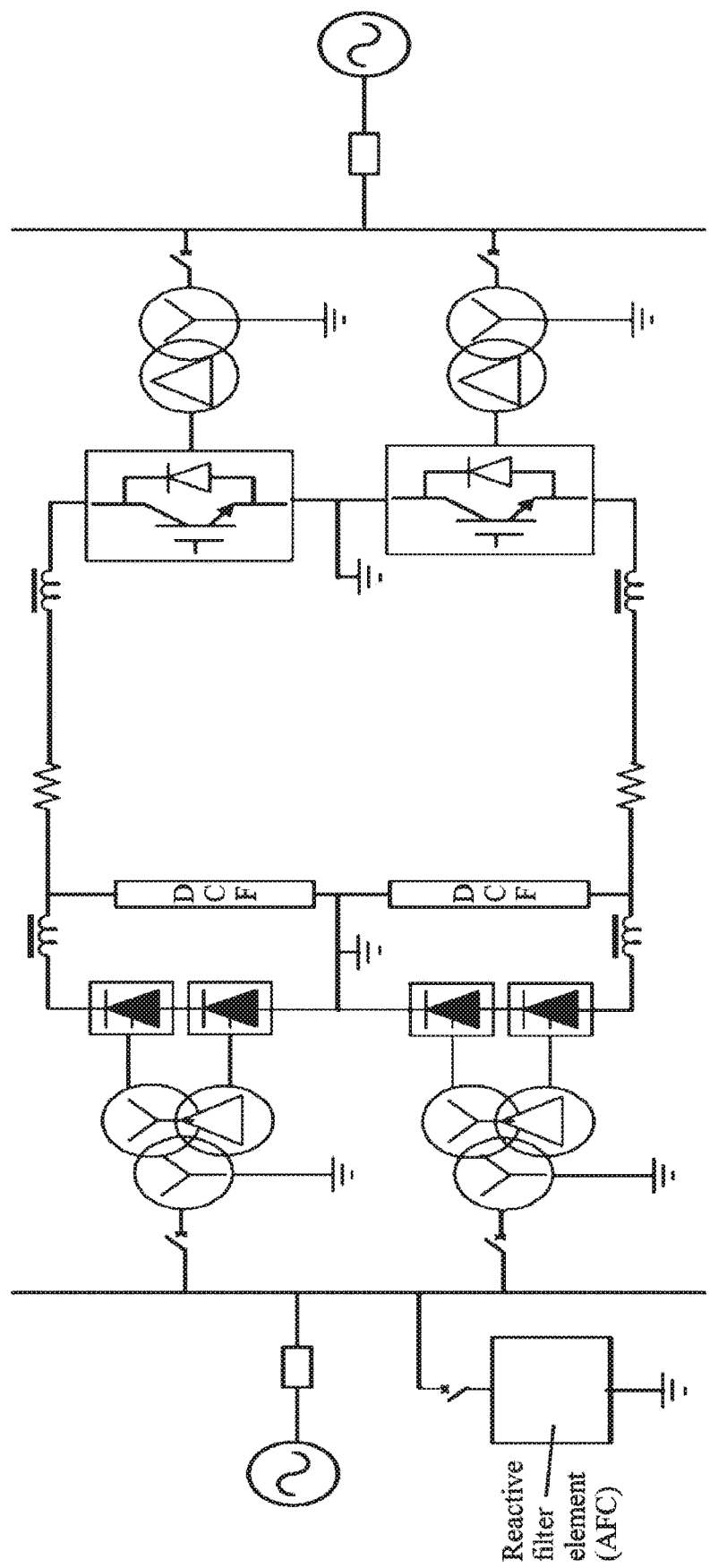
FIG. 2 is a schematic diagram of a hybrid dual-end DC transmission system based on bipolar symmetrical wiring.

A hybrid dual-end DC transmission system based on unipolar symmetrical wiring shown in FIG. 1 and a hybrid dual-end DC transmission system based on bipolar symmetrical wiring shown in FIG. 2 are two common hybrid DC transmission systems. The present invention is applicable to the hybrid DC transmission systems shown in FIG. 1 and FIG. 2, but is not limited thereto. The method is applicable to all hybrid DC transmission systems. A specific embodiment is described below with reference to FIG. 2.

As shown in FIG. 2, the hybrid DC transmission system includes a rectifier converter station and an inverter converter station, which are connected via two DC transmission lines. The rectifier converter station is used for converting a three-phase AC of an AC power grid at a sending end into a DC, and then transmitting the DC to the inverter converter station through the DC transmission line. It is required to determine, according to system engineering conditions, whether a passive filter is connected or not to a bus of an entry of the AC power grid at the sending end. When the current source converter is formed by a thyristor-based converter, the passive filter is required, and in some cases, a reactive compensation capacitor needs to be additionally disposed. The rectifier converter station in FIG. 2 is formed by connecting two groups of thyristor-based converter units in series, and a cascading node thereof is connected to a ground electrode. A positive end and a negative end after the series connection are both connected to the DC transmission lines via a smoothing reactor. Moreover, a DC filter is disposed between the DC line and the ground.

The thyristor-based converter unit has a twelve-pulse bridge circuit, where each arm is formed by connecting several thyristors in series, and the thyristor-based converter is controlled according to a constant DC power control policy. The thyristor-based converter is connected to the AC power grid at the sending end via a three-winding transformer with a wiring manner of Y0/Y/Δ, and an AC circuit breaker is disposed at the primary side of the transformer. The transformer can perform voltage level conversion for the three-phase AC of the AC system at the sending end, so as to adapt to a required DC voltage level. A different wiring manner at a secondary side of the transformer provides a three-phase AC with a phase angle difference of 30° for an upper and lower six-pulse converter bridge of the twelve-pulse bridge-type thyristor-based converter, so as to reduce a harmonic current flowing into the power grid.

The inverter converter station is used for converting the DC into a three-phase AC, and then transmitting the three-phase AC to an AC power grid at a receiving end. The inverter converter station is formed by connecting two groups of voltage source converters in series, and a cascading node thereof is connected to a ground electrode. The voltage source converter is connected to the AC power grid at the receiving end via a double-winding transformer with a wiring manner of Y0/Δ, and an AC circuit breaker is disposed at the primary side of the transformer. The voltage source converter is controlled according to a constant average capacitor voltage of sub-modules and constant reactive power control policy.

Figure 3:
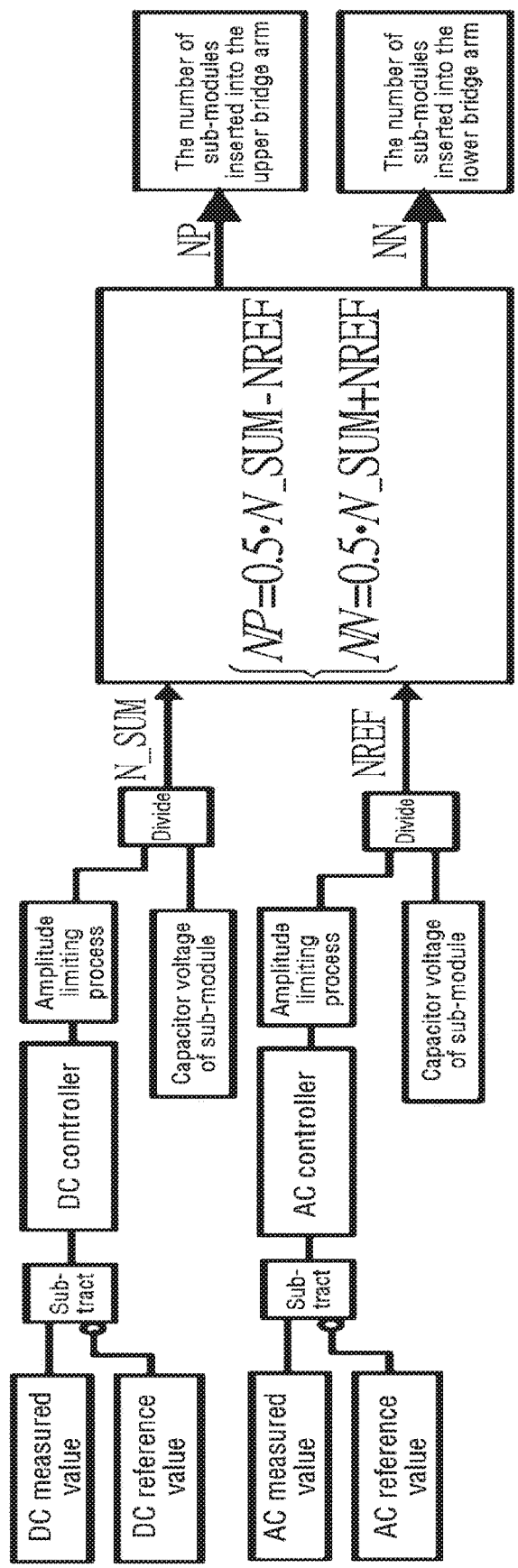
FIG. 3 is a logical block diagram of a method for controlling a hybrid DC transmission system of the present invention.

When a severe ground fault occurs in an AC system at the sending end in which the rectifier converter station is located, the DC voltage output by the thyristor-based converter unit may dramatically fall with the AC voltage, such that a DC voltage at the rectifier side is less than a voltage output by the modular multi-level converter at the inverter side. In this case, the DC current of the hybrid DC transmission system is less than a reference value set by the system. Therefore, a DC controller of an inverter station starts regulation and the reference value $U_{REF}$ of the DC voltage is reduced. In this case, the number of all sub-modules that are inserted into each phase of the modular multi-level converter and output a level unequal to zero is N_SUM=$U_{REF}$/Uc, where Uc is a capacitor voltage value of the sub-module. Because an AC side of the system is controlled by the constant average capacitor voltage of sub-modules, Uc may be regarded as a constant value. As the reference value $U_{REF}$ of the DC voltage decreases, the total number N_SUM of the inserted sub-modules of the modular multi-level converter also decreases, that is, a value of the DC voltage actually generated by the modular multi-level converter also decreases, such that the DC current transmitted by the hybrid DC transmission system gets close to the reference value, avoiding power transmitting breakdown of the system. A logic block diagram of the whole control is as shown in FIG. 3.

In the foregoing method for controlling a hybrid DC transmission system, the total number of inserted sub-modules of the modular multi-level converter and the polarity of an output level of the inserted sub-modules may also be adjusted in real time according to a DC voltage value actually measured by the rectifier station or a calculated value of the DC voltage.

In the foregoing method for controlling a hybrid DC transmission system, the total number of inserted sub-modules of the modular multi-level converter and the polarity of an output level of the inserted sub-modules may also be adjusted in real time according to the magnitude of the DC current, and a DC voltage value actually measured by a rectifier station at the other end or a calculated value of the DC voltage.

The hybrid DC transmission system shown in FIG. 2 is used as a specific embodiment below, to further describe a specific implementation manner of the control method in detail. It is assumed in the hybrid DC transmission system shown in FIG. 2 that, the arms of the modular multi-level converter at the inverter side are provided with a total of 200 sub-modules, and a capacitor voltage of each sub-module is rated to 1.6 kV. Then, in a normal operation, a rated DC voltage value of the system is 320 kV, that is, a reference value $U_{REF}$ of the DC voltage of the system is 320 kV. In a normal operation, the number of all sub-modules that are inserted into each phase of the modular multi-level converter and output a level unequal to zero is N_SUM=$U_{REF}$/Uc=200. Assuming that the number NREF of sub-modules that is converted according to a modulation voltage output by an AC control inner loop is 85, the number of sub-modules that need to be inserted to the upper arm of the modular multi-level converter is NP=0.5*200−85=15, and the number of sub-modules that need to be inserted to the lower arm of the modular multi-level converter is NP=0.5*200+85=185. That is, in this case, 15 sub-modules that output a positive level are inserted to the upper arm of the modular multi-level converter at the inverter side, and 185 sub-modules that output a positive level are inserted to the lower arm. When a severe ground fault occurs in an AC system at a sending end in which the rectifier converter station is located, the DC voltage output by the thyristor-based converter unit may dramatically fall with the AC voltage, such that a DC voltage at the rectifier side is less than a voltage output by the modular multi-level converter at the inverter side. In this case, the DC current of the hybrid DC transmission system is less than a reference value set by the system. As shown in FIG. 3, a DC controller in the logical block diagram starts regulation. In this case, the reference value $U_{REF}$ of the DC voltage of the modular multi-level converter at the inverter side may become less than 320 kV, and the number of all sub-modules that are inserted into each phase of the modular multi-level converter and output a level unequal to zero is N_SUM=$U_{REF}$/Uc<200, for example, N_SUM=125. That is, in this case, the DC voltage of the hybrid DC transmission system decreases from 320 kV to 200 kV, the voltage output by the modular multi-level converter at the inverter side is equivalent to the DC voltage at the rectifier side, and the DC current transmitted by the hybrid DC transmission system is restored to the DC reference value. Assuming that the number NREF of sub-modules that is converted according to a modulation voltage output by an AC control inner loop is still 85, the number of sub-modules that need to be inserted to the upper arm of the modular multi-level converter is NP=0.5*125−85=−23 (through rounding), and the number of sub-modules that need to be inserted to the lower arm of the modular multi-level converter is NP=0.5*125+85=148 (through rounding). That is, in this case, 23 sub-modules that output a negative level are inserted to the upper arm of the modular multi-level converter at the inverter side, and 148 sub-modules that output a positive level are inserted to the lower arm.

Figure 4:
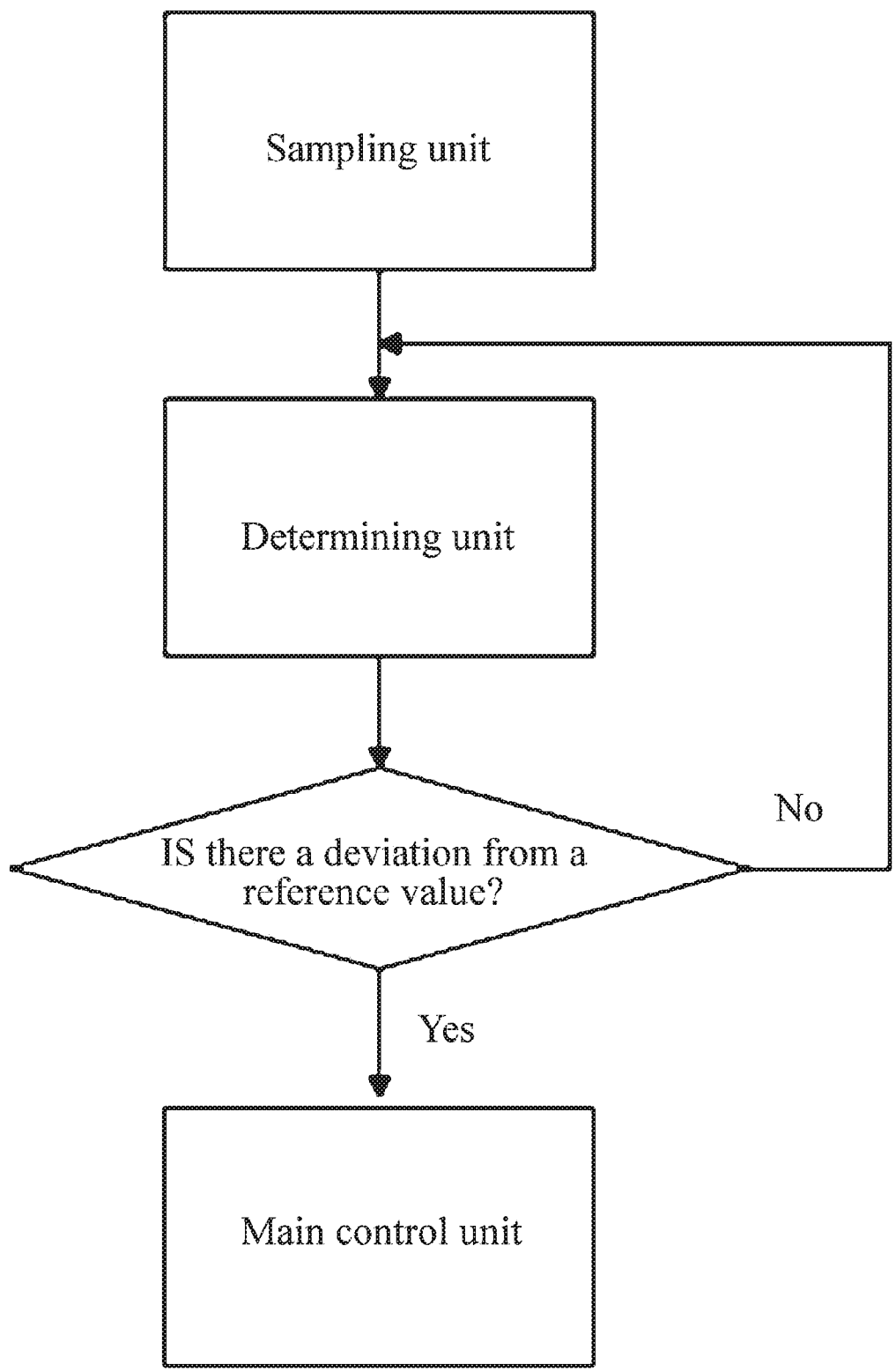
FIG. 4 is a structural block diagram of an apparatus for controlling a hybrid DC transmission system of the present invention.

The present invention further provides an apparatus for controlling a hybrid DC transmission system, as shown in FIG. 4, which includes: a sampling unit, a determining unit, and a main control unit, where the sampling unit is used for acquiring a DC voltage and a DC current of the hybrid DC transmission system, an AC of an AC power grid to which a modular multi-level converter is connected, and capacitor voltages of sub-modules of the modular multi-level converter;

the determining unit is used for determining, according to a status of a relevant analog quantity acquired by the sampling unit, whether there is a deviation between a DC power or the DC current transmitted by the hybrid DC transmission system and a reference value; and the main control unit is used for adjusting the total number of inserted sub-modules of the modular multi-level converter and the polarity of an output level of the inserted sub-modules in real time, according to a DC voltage of a rectifier station at the other end; or adjusting the total number of inserted sub-modules of the modular multi-level converter and the polarity of an output level of the inserted sub-modules in real time, according to the magnitude of a DC current or DC power; or adjusting the total number of inserted sub-modules of the modular multi-level converter and the polarity of an output level of the inserted sub-modules in real time, according to both the magnitude of the DC current and the DC voltage of the rectifier station at the other end.

The foregoing embodiments are merely provided to describe the technical idea of the present invention, but not to limit the protection scope of the present invention. Any modification made based on the technical solutions according to the technical idea provided by the present invention falls within the protection scope of the present invention.

What is claimed is:

1. A method for controlling a hybrid direct-current (DC) transmission system, characterized in that, comprising:
adjusting, by the hybrid direct-current transmission system according to a DC voltage of a rectifier station at a sending end, a total number of inserted sub-modules of a modular multi-level converter and a polarity of an output level of the inserted sub-modules in real time; or
   adjusting, by the hybrid direct-current transmission system according to a magnitude of a DC current or DC power, the total number of the inserted sub-modules of the modular multi-level converter and the polarity of the output level of the inserted sub-modules in real time; or
   adjusting, by the hybrid direct-current transmission system according to both the magnitude of the DC current and the DC voltage of the rectifier station at the sending end, the total number of the inserted sub-modules of the modular multi-level converter and the polarity of the output level of the inserted sub-modules in real time;
wherein the hybrid DC transmission system comprises a rectifier converter station connecting to an alternating current (AC) power grid at the sending end and the rectifier converter station forms by directly connecting two groups of thyristor-based converter units in series; and
wherein the hybrid DC transmission system comprises an inverter converter station connecting to the AC power grid at a receiving end and the inverter converter station forms by directly connecting two groups of voltage source converters in series.

2. The method for controlling a hybrid DC transmission system of claim 1, characterized in that:
and a DC transmission line connecting the rectifier converter station and the inverter converter station, the rectifier converter station comprising at least one group of current source converter units, and the inverter converter station comprising at least one group of modular multi-level converter units.

3. The method for controlling a hybrid DC transmission system of claim 1, characterized in that:
the DC voltage of the rectifier station at the sending end refers to an actually measured value of the DC voltage or a calculated value of the DC voltage.

4. The method for controlling a hybrid DC transmission system of claim 1, characterized in that: the total number of the inserted sub-modules of the modular multi-level converter refers to a number of all sub-modules that are actually put into operation and output a level unequal to zero in each phase of the modular multi-level converter.

5. The method for controlling a hybrid DC transmission system of claim 1, characterized in that: sub-modules capable of outputting a negative level are used to comprise the arms of the modular multi-level converter.

6. An apparatus for controlling a hybrid direct-current (DC) transmission system, characterized in that: comprising a sampling unit, a determining unit, and a main control unit, wherein:
the sampling unit is used for acquiring a DC voltage and a DC current of the hybrid DC transmission system, an AC current of an AC grid to which a modular multi-level converter is connected, and capacitor voltages of sub-modules of the modular multi-level converter;
the determining unit is used for determining, according to a status of a relevant analog quantity acquired by the sampling unit, whether there is a deviation between a DC power or the DC current transmitted by the hybrid DC transmission system and a reference value; and
the main control unit is used for adjusting a total number of inserted sub-modules of the modular multi-level converter and a polarity of an output level of the inserted sub-modules in real time, according to a DC voltage of a rectifier station at other end; or
adjusting the total number of the inserted sub-modules of the modular multi-level converter and the polarity of the output level of the inserted sub-modules in real time, according to a magnitude of a DC current or DC power; or
adjusting the total number of the inserted sub-modules of the modular multi-level converter and the polarity of the output level of the inserted sub-modules in real time, according to both the magnitude of the DC current and the DC voltage of the rectifier station at the other end;
wherein the hybrid DC transmission system comprises a rectifier converter station connecting to an alternating current (AC) power grid at the sending end and the rectifier converter station forms by directly connecting two groups of thyristor-based converter units in series; and
wherein the hybrid DC transmission system comprises an inverter converter station connecting to the AC power grid at a receiving end and the inverter converter station forms by directly connecting two groups of voltage source converters in series.

7. The apparatus for controlling a hybrid DC transmission system of claim 6, characterized in that: a DC transmission line connecting the rectifier converter station and the inverter converter station, the rectifier converter station comprising at least one group of current source converter units, and the inverter converter station comprising at least one group of modular multi-level converter units.

8. The apparatus for controlling a hybrid DC transmission system of claim 6, characterized in that: the DC voltage of the rectifier station at the other end refers to an actually measured value of the DC voltage or a calculated value of the DC voltage.

9. The apparatus for controlling a hybrid DC transmission system of claim 6, characterized in that: the total number of the inserted sub-modules of the modular multi-level converter refers to a number of all sub-modules that are actually put into operation and output a level unequal to zero in each phase of the modular multi-level converter.

10. The apparatus for controlling a hybrid DC transmission system of claim 6, characterized in that: sub-modules capable of outputting a negative level are used to comprise the arms of the modular multi-level converter.

* * * * *